United States Patent [19]

Hardy, Jr.

[11] 4,018,588
[45] Apr. 19, 1977

[54] METHOD AND APPARATUS FOR HANDLING SLAG HANDLING

[75] Inventor: Charles R. Hardy, Jr., Norristown, Pa.

[73] Assignee: Ecolaire Incorporated, Philadelphia, Pa.

[22] Filed: May 10, 1976

[21] Appl. No.: 684,608

[52] U.S. Cl. .................................... 65/19; 65/141;
48/206; 75/24; 75/30; 110/171; 122/235 N; 241/46.06; 266/195

[51] Int. Cl.² .................. C03B 18/00; C03B 37/00

[58] Field of Search .............. 75/24, 30; 65/19, 20, 65/141; 266/137, 201, 195; 110/171; 48/111, 209, 206; 122/235 N; 241/17, 46.06, 46.08

[56] References Cited

UNITED STATES PATENTS

| | | | |
|---|---|---|---|
| 1,957,583 | 5/1934 | Foresman | 110/171 |
| 2,871,114 | 1/1959 | Eastman | 48/206 |
| 3,018,174 | 1/1962 | Steeves | 48/206 X |
| 3,950,146 | 4/1976 | Funk | 48/206 X |

*Primary Examiner*—Robert L. Lindsay, Jr.
*Attorney, Agent, or Firm*—Seidel, Gonda & Goldhammer

[57] ABSTRACT

A slag handling apparatus and method are disclosed wherein slag is received at an elevated temperature of about 3000° F. and an elevated pressure of about 450 pounds per square inch and is handled so that it may be transported at atmospheric pressures and low temperatures of the order of 100°–200° F. The slag is sequentially fractured and ground by a grinder while descending downwardly through a column of water in a series of vessels.

10 Claims, 5 Drawing Figures

METHOD AND APPARATUS FOR HANDLING SLAG HANDLING

BACKGROUND

Slag handling apparatus at the present time fractures the incoming slag by a jet spray, permits the slag to descend by gravity through a column of water to a grinder. The slag is then ground by the grinder. The ground slag is then transported by a jet pump or the like to a wet silo.

The apparatus described above adequately treats the slag so as to reduce its temperature from about 3000° F. to a temperature of about 100°-200° F. However, the above-mentioned apparatus does little with respect to the high pressure at which the slag is treated namely approximately at 450 psi. As a result of the high pressure, the jet pump and the equipment downstream therefrom must be designed to accommodate the high pressure.

The apparatus and method of the present invention substantially reduces the pressure of the slag to approximately atmospheric pressure before it is transported by a jet pump or the like to a wet silo whereby the slag may be more readily handled with less danger.

The apparatus and method of the present invention is designed for receiving slag at an elevated temperature and pressure and permitting discharge of the slag at atmospheric pressure with a substantially reduced temperature. The apparatus includes an upright refractory lined quenching tank for receiving the slag at its upper end. The tank includes means for fracturing the incoming slag and contains the upper end of a vertical column of water.

A grinder is provided below the quenching tank and communicates therewith. The grinder contains a portion of said water. The grinder grinds the slag into small particles. The discharge port for the grinder outlet from the first vessel communicates with the inlet of a second vessel therebelow. The inlet and outlet of the second vessel are provided with valves. Conduit means are provided for selectively venting at least one of said vessels and for selectively equalizing the pressure in said vessels whereby the temperature of the slag is cooled by the vertical column of water through which it passes and the pressure of the slag is relieved by such venting of said one vessel.

It is an object of the present invention to provide continuous slag handling an apparatus for reducing the pressure and temperature of slag before it is transported to a wet silo or the like.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown in the drawings apparatus in accordance with the present invention designated generally as 10.

Figure 1:
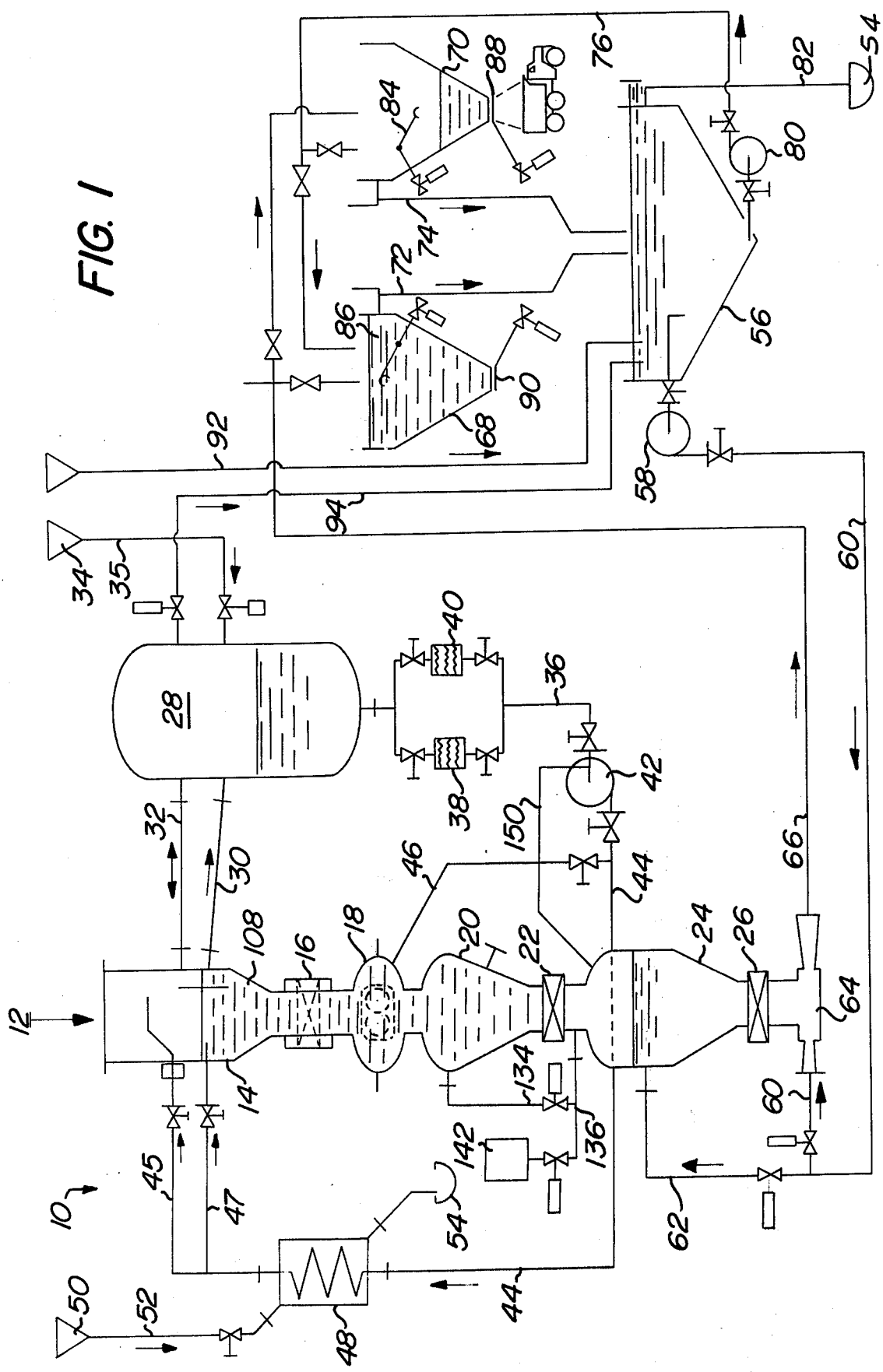
FIG. 1 is a schematic diagram of the apparatus of the present invention.

Referring initially to the schematic diagram in FIG. 1, slag at an elevated temperature of about 3000° F. and an elevated pressure of about 450 psi is received at the upper end of a refractory lined steel quenching tank 14 from a furnace monkey 12. The slag descends due to gravity through a vertical column of water and normally open valve 16 to the hopper in a grinder 18. From the grinder 18, the ground slag descends through the vertical column of water into a first vessel 20 preferably A.S.M.E. coded at 500 psi. A valve 22 controls flow from the outlet of vessel 20 and the inlet to a second vessel 24 preferably A.S.M.E. coded at 500 psi. The vessel 24 has a outlet control valve 26. Valves 16, 22 and 26 are preferably sliding gate valves.

Referring again to the quenching tank 14, it communicates with an overflow tank 28 by way of conduits 30 and 32. High pressure water from a source 34 may be communicated through a valved conduit 35 to the tank 28 preferably A.S.M.E. coded at 500 psi. The outlet from tank 28 includes a conduit 36 having a pair of filters 38 and 40 in parallel with each other with appropriate valves so that flow from tank 28 may be through either one of the filters. Conduit 36 is connected to the inlet side of pump 42.

The outlet side of pump 42 is connected to conduit 44. A small diameter conduit 46 having a valve therein extends from conduit 44 to the grinder 18 to supply seal water. Conduit 44 extends to a heat exchanger 48 and then forms branch conduits 45 and 47. Water from a low pressure source 50 flows through conduit 52 and through the heat exchanger 48 to a waste discharge conduit 54 to cool the water in conduit 44.

On the righthand side of FIG. 1, there is illustrated a vat 56. Water from vat 56 may be pumped by pump 58 through conduit 60. Conduit 60 extends to a jet pump 64 and has a valved branch conduit 62 of smaller diameter for introducing fill water into vessel 24. Jet pump 64 communicates with the discharge port of valve 26 whereby slag may be withdrawn and transported by the water in conduit 60, through conduit 66, to one or more wet silos 68, 70.

Overflow from the wet silos 68, 70 communicates with the vat 56 by way of conduits 72, 74 respectively. Settled sludge slurry water is pumped from the bottom of vat 56 by way of pump 80 and conduit 76 to the upper end of the wet silos 68, 70, when desired.

An overflow conduit 82 extends from the vat 56 to the waste discharge conduit 54. Wet silo 70 may be provided with a pneumatically operated syphon 84. A similar syphon 86 may be provided for the wet silo 68. Discharge from the silo 70 onto a vehicle is controlled by a pneumatically operated valve 88. A similar valve 90 is provided for control of discharge from the wet silo 68. Make-up Water from a low pressure source may be added to the vat 56 by way of conduit 92. Conduit 94 is a blow-down conduit extending from the overflow tank 28 to the vat 56.

Figure 2A:
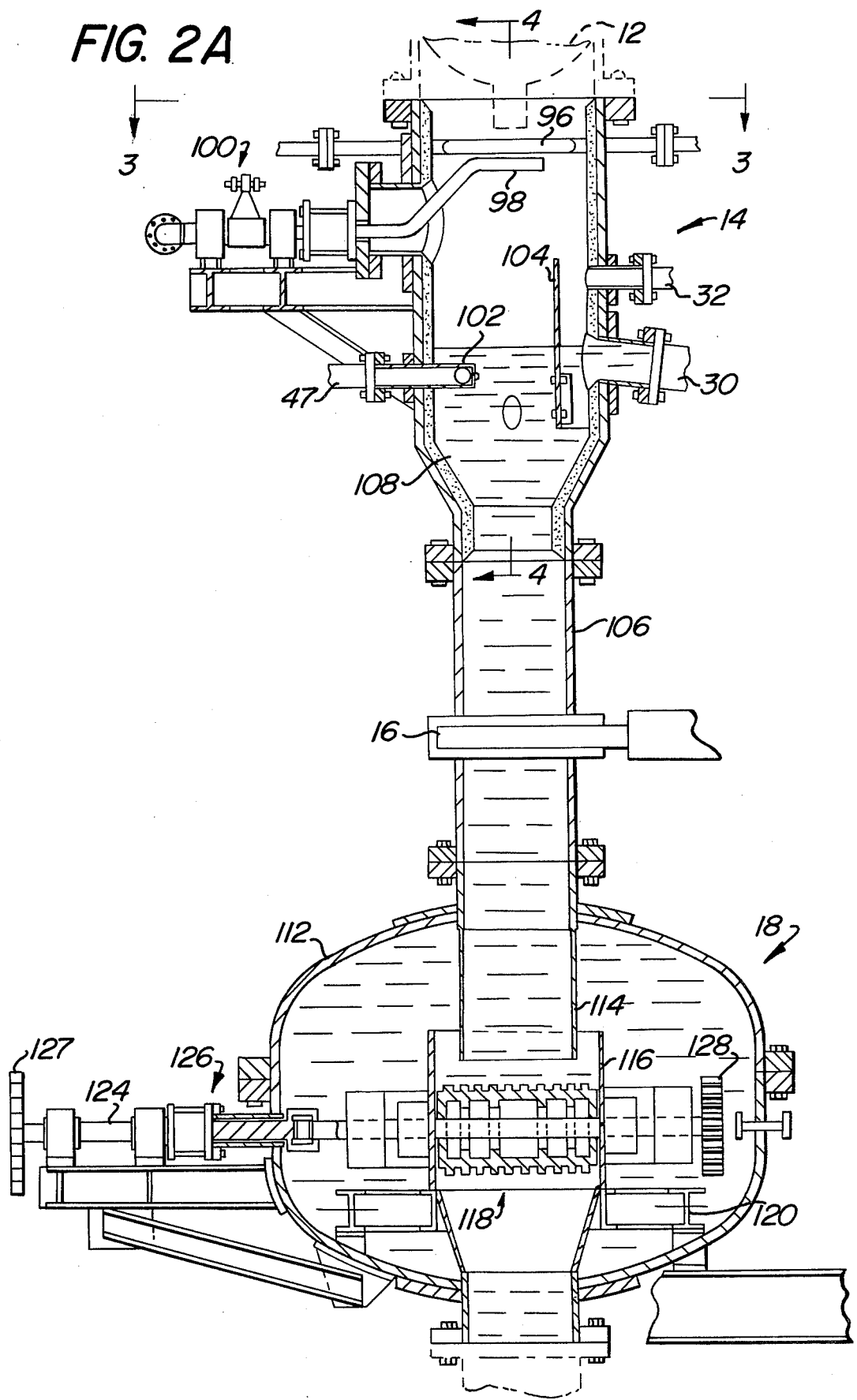
FIG. 2A is an enlarged detail view of the quenching tank and grinder in vertical section.
Figure 3:
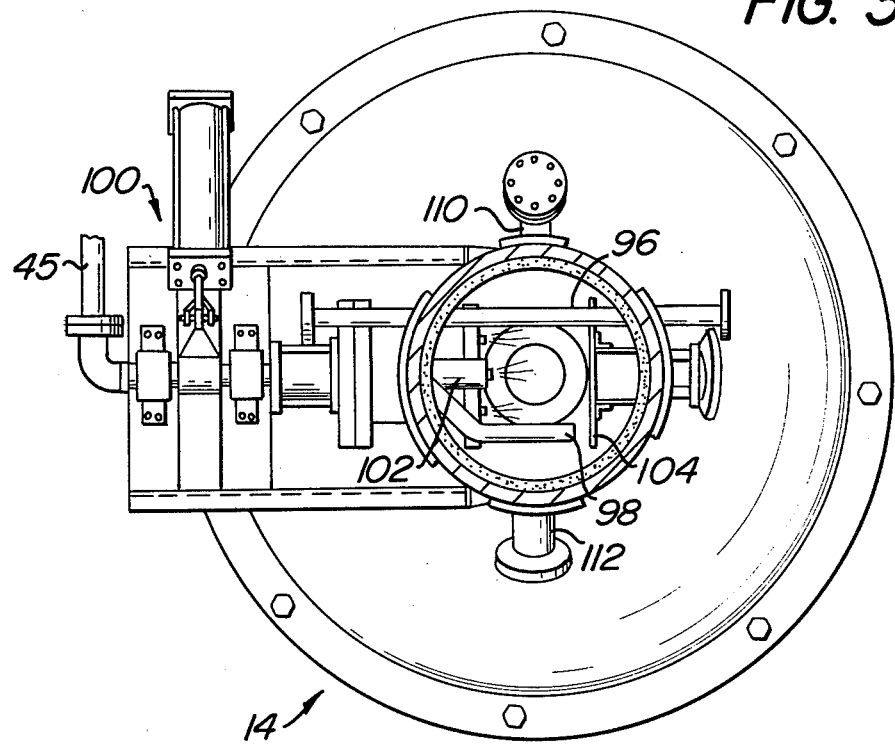
FIG. 3 is a sectional view taken along the line 3—3 in FIG. 2A.
Figure 4:
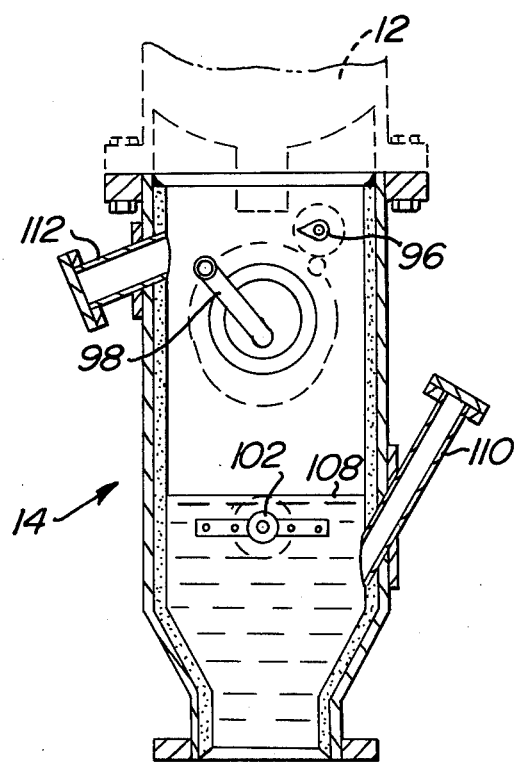
FIG. 4 is a sectional view taken along the line 4—4 in FIG. 2A.

Referring to FIGS. 2A, 3 and 4, the refractory lined quenching tank 14 is provided with a water cooled wiper bar 96. A water cooled swiper 98 oscillates through an arc and maintains the discharge port of the furnace monkey 12 clean by cutting off stalactites. Water communicated to the interior of the swiper 98 by way of conduit 45 discharges into the pool of water 108.

The swiper 98 is provided with a drive 100. As the slag descends through the quenching tank 14, the slag is fractured by the discharge of water from nozzle 102. Conduit 47 is connected to nozzle 102 adapted to discharge water at a pressure of 575 psi with a flow rate of 160 gpm. To prevent damage to the refractory lining, a baffle plate 104 is provided. Steam generated above liquid level in the tank 14 communicates with the overflow tank 28 of the vent conduit 32.

As shown more clearly in FIGS. 3 and 4, the tank 14 may be provided with a hole 110 and a television observation port 112, each of which are closed during normal operation. The lower end of the tank 14 is connected to the upper end of a conduit 106 containing the normally open valve 16. The lower end of conduit 106 is connected to a conduit extension 114.

The conduit extension 114 extends into the housing 112 of the grinder 18 and terminates within a hopper 116 containing a pair of grinder rolls 118. Grinder rolls 118 in hopper 116 are mounted on a support 120 within the housing 112. The grinder rolls 118 are parallel and rotate on fixed centers towards each other about their longitudinal axes to reduce large pieces to slag to a maximum size of about 1 to 2 inches in transverse dimensons.

One of the grinder rolls 118 is connected to a drive shaft 124. Shaft 124 extends through a wall of the housing 112 and a seal 126. A sprocket 127 is connected to the shaft 124 and is adapted to be connected to a motor not shown by a drive chain. In the righthand end of the grinder rolls 118 are coupled together by meshing gears 128 so that they will rotate in opposite directions.

Figure 2B:
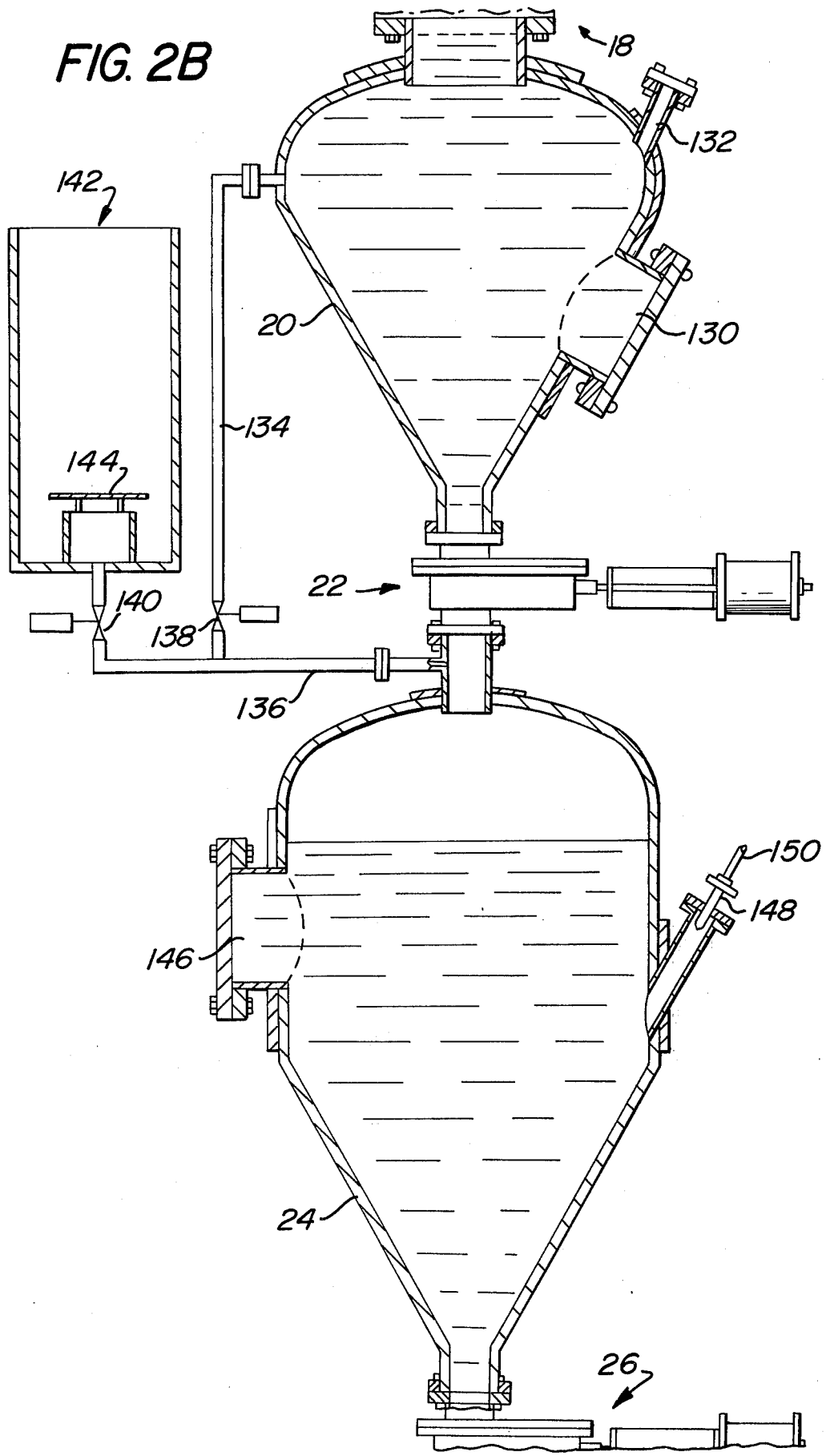
FIG. 2B is an enlarged detail view of the vessels in vertical section.

Referring to FIG. 2B, the first vessel 20 is provided with an access port 130 which is closed during normal operation. Vessel 20 is also provided with a downwardly angularly extending closed poke hole 132. Vessel 20 is smaller than vessel 24. For example, if vessel 24 has a storage capacity of about 150 cubic feet, vessel 20 may have a storage capacity of about 75 cubic feet. Vessels 20 and 24 preferably have an outlet diameter of about 8 inches. The dimensions and capacity of the vessels may be varied as desired. The walls at the lower end of the vessel 20 taper toward the outlet controlled by valve 22. Valve 22 selectively controls flow between vessel 20 and vessel 24.

A conduit 134 extends from an upper portion of the vessel 20 to conduit 136. Conduit 136 extends from the upper end of vessel 24 to a stand pipe 142. Conduit 134 is provided with a selectively operable valve 138 and conduit 136 is provided with a similar valve 140. A baffle 144 is provided within the stand pipe 142 opposite the entry port for conduit 136. The upper end of stand pipe 142 communicates with the atmosphere.

A nozzle 148 is provided on the vessel 24 and directed downwardly toward the outlet thereof. Nozzle 144 is connected by way of conduit 150 to the outlet from pump 58. Nozzle 148 is utilized to facilitate cleaning of the interior of the lower end of vessel 24. The lower end of vessel 24 is tapered toward the outlet valve 26.

The apparatus 10 operates as follows.

Slag at the elevated temperatures and pressures referred to above discharge continuously from the furnace monkey 12 into the upper end of the quenching tank 14. The swiper 98 continues to oscillate to prevent the formation of stalactites. The slag is fractured by the high pressure jet from nozzle 102 and descends downwardly through the column of water 108 to the hopper 116.

In the hopper 116, the slag is ground by the grinder rolls 118 and discharged downwardly through the column of water 108 into the first vessel 20. Valves 138 and 140 are closed. Valve 22 is open and valve 26 is closed. Hence, the ground slag accumulates in the vessel 24. After a sufficient quantity of slag has accumulated in vessel 24, its temperature will have been reduced by the column of water 18 to about 150°. However, the pressure of the slag is still at an elevated pressure.

When it is desired to further transport the slag accumulated in vessel 24, valve 22 is closed so that the continuously processed slag will now start to accumulate in vessel 20. The internal pressure within vessel 24 is relieved by opening valve 140. This will result in water under pressure being discharged into the stand pipe 142. Thereafter, valve 140 is closed and valve 26 is opened. Water under pressure from pump 50 flows at a rate of about 600 gpm through the jet pump 64 and into vessel 24 by way of conduit 62. The flow of water through pump 64 withdraws and transports the slag to the wet silo 68 and/or wet silo 70.

When all of the slag has been removed from vessel 24, valve 26 is closed. The valve in conduit 60 is closed. Vessel 24 is now partially filled with water from conduit 62. Valve 138 is then opened to equalize the pressure between vessels 20 and 24. When such pressure equalization has been attained, valve 138 is closed. Then valve 22 is opened to permit the accumulated slag to transfer by gravity from vessel 20 to vessel 24. The above sequence is repeated when a sufficient quantity of slag has accumulated in vessel 24.

When desired, the contents of the wet silo 68 and/or 70 may be discharged into a vehicle or the like. The filters 38, 40 filter out any foreign matter in the water before such water is pumped to the nozzle 102 and/or wiper 98. As a result of the slag being at atmospheric pressure before it is withdrawn from vessel 24 by the jet pump 64, jet pump 64 and all components downstream therefrom are materially simplified and less expensive while minimizing the potential danger of transporting and handling high pressure slag.

The present invention may be embodied in other specific forms without departing from the spirit or essential attributes thereof and, accordingly, reference should be made to the appended claims, rather than to the foregoing specification as indicating the scope of the invention.

I claim:

1. Slag handling apparatus comprising an upright refractory lined quenching tank for continously receiving slag at its upper end, means for fracturing slag by use of a high pressure jet of water in said tank, a grinder below and communicating with said tank for continuously receiving and grinding the fractured slag, a first vessel below and communicating with said grinder for receiving ground slag, a second vessel located below and communicting with said first vessel, valve means between said vessels for controlling flow of slag therebetween, another valve means controlling the outlet from the lower end of said second vessel, valved conduit means for selectively venting one of said vessels and for selectively equalizing the pressure in said vessels, and an overflow tank communicating with said quenching tank for receiving overflow of water therefrom.

2. Slag handling apparatus in accordance with claim 1 wherein said conduit means includes a stand pipe and a valved conduit communicating said stand pipe with the upper end of said second vessel.

3. Slag handling apparatus in accordance with claim 2 wherein said second vessel is substantially larger than said first vessel.

4. Slag handling apparatus in accordance with claim 3 including a jet pump connected to the valved outlet of said second vessel, a wet silo, a conduit extending from said silo to the outlet of said jet pump.

5. Slag handling apparatus in accordance with claim 1 including a conduit extending from said overflow tank to said water jet, said last-mentioned conduit including filters and a pump in series.

6. Slag handling apparatus comprising an upright refractory lined quenching tank for receiving slag at its upper end, a movable swiper bar at said upper end, means for fracturing slag by use of a high pressure jet of water in said tank, a grinder below and communicating with said tank, said grinder having a hopper for receiving slag from said tank and dual rolls for grinding the fractured slag, a first pressure vessel below and communicating with said grinder for receiving ground slag therefrom, a second pressure vessel located below and communicating with the outlet of said first vessel, a first valve between said vessels, a second valve controlling the outlet from the lower end of said second vessel, valved conduit means for selectively venting said second vessel and for selectively equalizing the pressure in said vessels, said conduit means including a stand pipe and a valved conduit communicating said stand pipe with the upper end of said second vessel, said second vessel being substantially larger than said first vessel, a wet silo, and means for transferring slag from the outlet of said second vessel to said wet silo.

7. A method of continuously handling slag at an elevated temperature and an elevated pressure as it discharges from a furnace comprising the steps of cooling the slag by passing it downwardly through a vertical column of water contained in a quenching tank, grinder, first vessel and second vessel in that sequence, fracturing the slag in said quenching tank, grinding the fractured slag in said grinder, accumulating the ground slag in said second vessel, relieving the pressure within said second vessel while isolating said second vessel from said first vessel, withdrawing the accumulated slag from said second vessel while additional slag is accumulated in said first vessel and the vessels are isolated from one another, and introducing water into said second vessel during said step of withdrawing the accumulated slag.

8. A method in accordance with claim 7 including the step of equalizing the pressure between said vessels after slag has been removed from the second vessel, and then withdrawing the additional slag from the first vessel and transferring the slag to the second vessel after the two vessels have been equalized in pressure.

9. A method in accordance with claim 7 wherein said step of relieving the pressure in said vessel includes venting the second vessel through a stand pipe.

10. A method in accordance with claim 7 including withdrawing the accumulated slag from said second vessel by a jet pump.

* * * * *